Feb. 6, 1934. W. G. THRASHER 1,946,042
PROCESS AND APPARATUS FOR CHARGING PYROTECHNICAL ARTICLES AND THE LIKE
Filed June 15, 1932
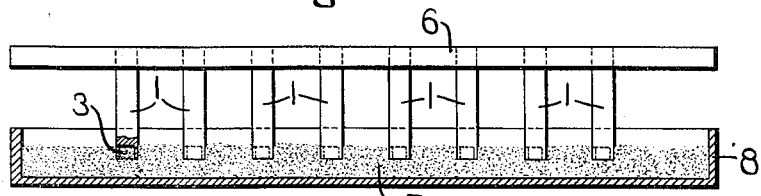
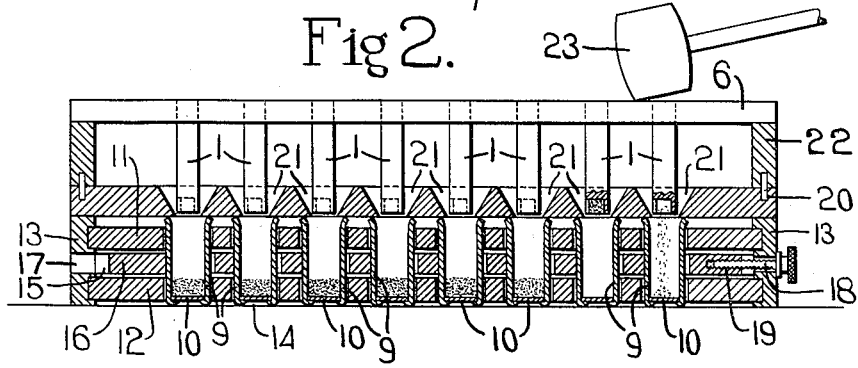
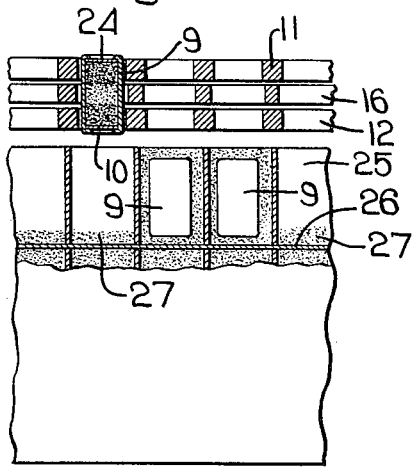
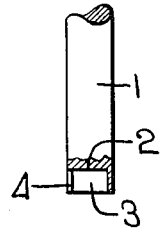
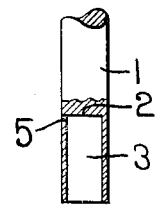
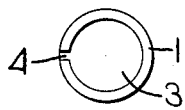
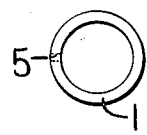
Inventor.
Warren G. Thrasher
by Heard Smith & Tennant.
Attys.

Patented Feb. 6, 1934

1,946,042

UNITED STATES PATENT OFFICE 1,946,042

PROCESS AND APPARATUS FOR CHARGING PYROTECHNICAL ARTICLES AND THE LIKE

Warren G. Thrasher, West Hanover, Mass., assignor to National Fireworks, Inc., West Hanover, Mass., a corporation of Massachusetts Application June 15, 1932. Serial No. 617,335

5 Claims. (Cl. 86—20)

This invention relates to methods and apparatus for removing a measured amount of finely granular material from a mass thereof and also desirably for depositing the measured amount in a suitable receptacle.

More particularly the invention relates to methods and apparatus for measuring and transferring finely granular dry pyrotechnical material from a mass thereof into suitable shells, such as those used in the manufacture of toy torpedoes, bombs, flares, and the like.

In the manufacture of pyrotechnical articles finely round chemicals are employed which are easily dissipated by drafts of air which cause not only the loss of materials, but also produces a dust in the atmosphere which is unhealthy for operatives where such chemicals are used as contain arsenic, phosphorus, etc.

Many of the materials employed in the manufacture of pyrotechnical articles are ground to an exceeding fineness, such as will enable them to pass through screens of from one hundred to two hundred mesh per square inch. Many of them are of light specific gravity. In the usual manufacture of such pyrotechnical articles the desired amount of the material is measured by thrusting into the mass of the material open scoops and then striking the scoops across a straight edge to insure accuracy of the measured amount, after which the material is deposited from the scoop into the receptacle, such as paper shells. In thus transferring measured amounts of material from the mass to the shells, a disturbance of the air is created producing eddying currents which dissipate more or less of the material into the air as dust, and also when the scoop is moved rapidly from the mass to the shell is likely to cause more or less of the material to be blown away from the scoop and consequently wasted.

While it is usual to load shells by individual scoops, I am aware that it has been proposed to use certain apparatus in which a plurality or gang of open scoops are used in a similar manner.

The principal object of the present invention is to provide a process and apparatus for removing from a mass of finely granular dry material accurately measured amounts of the material and transferring the same to receptacles therefor without substantial loss of material or of the creation of air currents which will dissipate the material as a fine dust in the air.

The process comprises broadly thrusting, preferably substantially vertically, into the mass of the finely granular material, the open end of a cylindrical container having a closed bottom located at such distance from the end of the container as to provide a cavity of predetermined capacity to a sufficient depth and with sufficient force completely to fill and adhesively to compact the material therein, so that when the container is withdrawn from the mass an accurately measured amount of the material will be retained in the container and protected by the wall thereof during transportation to the place in which it is deposited in the suitable receptacle or shell. The material may be delivered from the container when superimposed over the shell by jarring or rapping the container.

The process also contemplates the assembling of the receptacles or shells, into which the finely granular material is to be loaded in predetermined spaced relation, and simultaneously transferring measured amounts of the finely granular material to said shells by simultaneously thrusting a like plurality of similarly spaced cylindrical containers of the character above described into the mass of material to such depth and with such force as will cause the cavities to be completely filled and the material adhesively compacted therein, then removing the filled containers from the mass, placing the same over the receptacles or shells, and jarring the containers simultaneously to dislodge the material from the containers into the receptacles or shells.

The invention further relates to devices or machines for accomplishing the process above described. Such device in its simplest form comprises a holder, preferably in the form of a cylindrical rod or tube, having a cylindrical cavity in its lower end with a bottom located at such distance from the lower end as to provide a cavity of predetermined capacity. Such a device may be thrust into a mass of the finely granular material to a sufficient depth and with sufficient force completely to fill and adhesively to compact the accurately measured amount of material therein. The device may be withdrawn from the mass of material in an axial direction and then transported to the receptacle without loss of material, as the material is completely housed within the cylindrical wall of the container, and none of the material, except that at the end of the cavity, exposed to the action of the air as it is transported to the receptacle.

By reason of the fact that the material is adhesively compacted within the cavity, very little, if any, loss occurs in the transportation of the material. Furthermore, no dust is raised which will be unhealthy to the operatives.

Where pyrotechnical devices are being manufactured upon a large scale, a multiplicity of the shells or receptacles may be arranged, and supported in rows in predetermined spaced relation, and a like plurality of measuring devices may be similarly arranged and secured to a suitable support, so that they may be thrust simultaneously into the mass of material and simultaneously transported and positioned over the shells or receptacles, and the material dislodged from them by striking or jarring the support for the measuring devices. Obviously, the measuring devices may be constructed of suitable diameter and the cavities may be of sufficient depth to contain any desired predetermined amount of the granular material. Thus the uniform loading of the shells may at all times be insured. Where a machine of this character is employed the loading of the shells will proceed with exceeding rapidity and accuracy and without substantial loss of material, and will not endanger the health of the operatives.

Suitable apparatus for performing the process above described is illustrated in the accompanying drawing, in which, Fig. 1 is a view, partially in section and partially in side elevation, of a machine for simultaneously removing from the mass of material uniformly measured amounts of fine granular material;

Fig. 2 is a similar view illustrating the device for removing the material from the mass after it has been transported and superimposed over a series of receptacles or shells which are suitably supported in similarly spaced relation to that of the measuring devices, and illustrating also the convenient means for dislodging the material from the cavities of the measuring devices;

Fig. 3 illustrates mechanism for supporting a loaded shell superimposed over cellular compartments of a package or carton, certain of the shells having been deposited in the carton, while another is shown in position before it is deposited in the cell of the package;

Fig. 4 is a detail illustration, partly in section, of a measuring device in the form of a rod having a cylindrical cavity of predetermined depth extending upwardly from the lower end thereof with the wall provided with a slot to admit air to aid in the discharge of the material therefrom;

Fig. 5 is a similar view of a measuring device having a much deeper cavity and consequently adapted to contain a larger charge of the material and provided near the base of the cavity with a small aperture or port to admit air to aid in the discharge of the material therefrom;

Fig. 6 is a bottom plan view of the construction illustrated in Fig. 4; and,

Fig. 7 is a bottom plan view of the construction shown in Fig. 5.

The measuring device shown in Fig. 4 comprises a cylindrical rod 1, preferably of brass, or other material, which will not create a spark if struck against another piece of metal, having at its lower end an axial cylindrical bore provided with a closed bottom 2 at such distance from the open end thereof as will provide a cavity 3 of predetermined capacity. Inasmuch as the depth of the cavity 3 is small, its wall is provided with a slit 4 extending from the lower end of the wall upwardly preferably to or substantially to the base thereof, for the purpose of admitting air, when the rod is jarred, to aid in the discharge of the compacted granular material.

The construction illustrated in Fig. 5 similarly comprises a rod 1, preferably of brass, or other material, which will not create a spark if struck against another piece of metal, having at its lower end a cylindrical bore extending upwardly a considerably greater distance than that illustrated in Fig. 4, and provided with a closed bottom 2. In this construction the wall of the cavity is provided at or near the base 2 with a hole or port 5 adapted to admit air into the cavity to facilitate the discharge of the compacted material therefrom when the rod is jarred. Preferably solid cylindrical rods are thus bored upwardly from the lower end to provide the measuring cavity of predetermined capacity and obviously the rod may be bored to any desired depth.

Obviously a tubular rod may be employed by providing a partition at such predetermined distance from the open end of the tube as will produce a cavity of predetermined capacity. Such measuring devices may be used individually or a plurality of them supported in such manner that they may be employed to measure and transport several equal amounts of the material simultaneously.

Fig. 1 illustrates a convenient construction in which a series of rods or measuring devices 1, having suitable cylindrical cavities 3 at their lower ends, are secured at their upper ends to a plate or holder 6 in preferably equally spaced relation. As shown in Fig. 1, the measuring devices are in the attitude of being thrust simultaneously into a mass 7 of finely granular material contained in a suitable tray 8.

Fig. 2 illustrates a series of rods or measuring devices 1 supported upon the plate or holder 6 superimposed over a series of similarly spaced shells or receptacles.

Any suitable means may be provided for holding the receptacles or shells in properly spaced relation. Preferably an assembling device of the character disclosed in the prior Patent No. 1,744,751, granted to George J. J. Clark, January 28, 1930, is employed. In this construction the shells comprise tubes 9, the lower end of each of which is provided with a closure in the form of a disk 10 which is held therein by crimping the lower end of the tube. Desirably the upper ends of the shells are slightly expanded in order to insure the deposition of all the material of the charge into the shells. The shells are held in properly spaced relation by clamping apparatus comprising an upper board 11 and a lower board 12 of suitable thickness which are spaced apart and secured in a rectangular frame comprising end members 13 with suitable side members 14. The side members are provided with longitudinally extending grooves 15 in which a central clamping member 16 is slidably mounted. One of the end members 14 is provided with a recess 17 to permit the introduction of the clamping member 16. The upper and lower boards 11 and 12 are provided with vertically alined cylindrical apertures adapted rather loosely to receive the shells 9 and the clamping member 16 is provided with slightly larger apertures positioned to register with the apertures in the boards 16 and 17.

Suitable means are provided for moving the clamping member 16 lengthwise in such a manner as to clamp the shells 9 against the walls of the apertures in the boards 11 and 12. In the construction illustrated a screw 18 is rotatably mounted in the end 13 and engages the threaded wall of a socket 19 in the adjacent end of the clamping member 16. Obviously by rotating the screw 18 in proper directions the clamping board 16 may be moved endwise sufficiently to clamp or to release the shells which have been placed in the apertures. A guide board 20, which is detachably supported upon the end 13, is provided with a series of downwardly extending conoidal apertures 21 which register with the upper ends of the shells and which are slightly smaller in diameter than the upper ends of the shells. Suitable supporting blocks 22, secured to the ends of the guide board 20, serve as supports for the plate 6 when the same is moved into position to superimpose the measuring devices 1 over the several shells.

In the operation of the device, therefore, the plate or holder 6 with the measuring devices depending therefrom is held over the tray 8 containing the finely powdered material 7. The holder 6 is then depressed evenly at its ends until the lower hollow ends of the measuring devices are thrust into the granular material with sufficient force completely to fill the cavities in the lower ends thereof and to compact the material adhesively therein. The plate or holder 6 is then raised preferably vertically upwardly, transported over the holder for the shells illustrated in Fig. 2, and carefully deposited upon the supports 22 with the measuring devices superimposed over the several shells which are supported therein. The holder or plate 6 may then be struck gently with a mallet 23 and the vibration thereof caused thereby and transmitted to the measuring devices will readily discharge the material from the cavities of the measuring devices into the respective shells. The different materials with which the shells are to be loaded may be introduced into the shells in like manner where they will repose in stratified relation, as illustrated in Fig. 3. The covers of the shells may then be applied and crimped over in any desired manner.

Coarse granular material, such as gravel, used in the manufacture of torpedoes, may alternatively be loaded into the shells in the manner disclosed in the patent to Clark, the measuring devices embodying the present invention being employed for the purpose of loading the oxidizing and reducing agent respectively into the shells. In thus loading torpedo shells, one of the active explosive materials, such as the oxidizing material or reducing material, is first loaded into the shell, then the friction material, such as gravel or sand, introduced, and finally the other active material, so that the strata of active materials are separated by the inert frictional material.

Closures, such as paper disks 24, are then introduced into the upper ends of the shells and the walls of the shells crimped down upon the filled shells. The packaging of the torpedoes and the mixing of the ingredients contained in the shells may be performed in the manner disclosed in the patent to Clark above mentioned.

As illustrated in Fig. 3 the shell-clamping apparatus containing the filled and closed shells are superimposed over a carton having a series of cells 25 resting upon a bottom or partition 26, the lower portion of the cells being covered with a layer of sawdust 27. The screw 18 may then be rotated in a direction to release the shells and permit them to drop into the respective cells. After this is accomplished, the cells may be filled with sawdust and covered by another partition, or by the cover of the carton. After the cartons have been filled they may be subjected individually or in groups to such agitation as may be required thoroughly to mix the materials contained in the respective shells, so that when the torpedoes are removed from the package and thrown against a rigid object they will be practically certain to burst upon impact. The method of thus mixing the materials within the shells may be accomplished by the mechanism disclosed in the patent to Clark above mentioned.

While the present invention is more particularly described herein in respect to the loading of torpedo shells, it will be understood that the invention may be employed either to load shells with finely granular material individually or in groups, and that the invention herein described may be employed for the purpose of loading shells or any other forms of receptacle with finely granular material by the process and/or apparatus herein described.

It will also be understood that the measuring devices may be of any desirable size and provided with cavities of the predetermined required capacity, as it is found that the invention may be employed accurately to measure and transport charges of finely granular material from very small amounts to comparatively large charges in accordance with the proportions required in the manufacture of pyrotechnical articles.

It will be understood that the particular embodiment of the invention disclosed herein is of an illustrative character and is not restrictive, and that various changes in form, construction and arrangement of parts may be made within the scope and meaning of the following claims.

Having thus described the invention, what is claimed as new, and desired to be secured by Letters Patent, is:

1. The process of loading shells with pyrotechnical material by delivering measured amounts of finely granular dry pyrotechnical material to the shell therefor which comprises thrusting substantially vertically into said mass a rigid bar of material incapable of producing a spark and having a bore at its end providing a cylindrical container having a closed bottom located at such distance from the open end as to provide a cavity of predetermined capacity to a sufficient depth and with sufficient force completely to fill and adhesively to compact the pyrotechnical material therein and removing the filled container from said mass, placing the same over and in close proximity to the mouth of the shell and jarring the bar to discharge the granular material from said container into said shell, loading other pyrotechnical materials into the shell and finally agitating the shell to mix the pyrotechnical materials therein.

2. The process of delivering a measured amount of finely granular dry pyrotechnical material to a plurality of shells which comprises assembling the shells in predetermined spaced relation, simultaneously thrusting a like plurality of similarly spaced rigid bars of material incapable of producing a spark and having at like ends bores providing cylindrical containers each having an open end and a closed bottom located at such distance from said open end as to provide a cavity of predetermined capacity into the mass of finely ground material pyrotechnical to a sufficient depth and with sufficient force completely to fill and adhesively compact therein a predetermined amount of said material, superimposing the containers over and in close proximity to the open ends of the respective shells and jarring said containers to dislodge the material therefrom into said shells, loading other pyrotechnical materials into the shells and finally agitating the shells to mix the pyrotechnical materials therein.

3. A device for removing a measured amount of finely granular dry material from a mass thereof comprising a body of relatively greater length than its diameter having a cylindrical recess extending inwardly from one end thereof and provided with a closed bottom located at such distance from the open end of said recess as to provide a cavity of predetermined capacity operable upon the thrust of said open end into a mass of said material to a sufficient depth and with sufficient force to fill and adhesively to compact the material into said recess, the wall of said recess being provided with a vent to admit air and thereby insure complete discharging of the material upon jarring of the device.

4. A device for removing a measured amount of finely granular dry material from a mass thereof comprising a cylindrical rod having an axial bore extending inwardly from one end thereof to a depth sufficient to provide a cavity of predetermined capacity, and having a vent extending through the wall of said cavity operable when thrust into a mass of said granular material a sufficient distance and with sufficient force completely to fill and adhesively to compact said material into said cavity, whereby upon withdrawal of said device from the mass of material a measured amount of said material will be removed therefrom which upon jarring of said rod will be discharged from said cavity.

5. A machine for transferring measured amounts of finely granular dry pyrotechnical material from a mass thereof to a plurality of receptacles comprising means for holding said receptacles in a predetermined spaced relation with the open ends thereof uppermost, in combination with a measuring device comprising a movable holder having secured therein in spaced relation complementary to that of said receptacles a plurality of brass tubular members having lower open ends with closed bottoms located at such predetermined distances from the lower ends thereof as to provide cavities of predetermined capacity operable when the lower open ends of said tubular members are thrust simultaneously into a mass of said material to a sufficient depth and with sufficient pressure completely to fill and adhesively to compact the material into said cavities, whereby said filled tubular members may be simultaneously removed from said mass of material and said holder superimposed over the respective receptacles and the material simultaneously dislodged from said cavities into the respective receptacles by jarring the holder.

WARREN G. THRASHER.